United States Patent [19]

Choi

[11] Patent Number: 4,956,082

[45] Date of Patent: Sep. 11, 1990

[54] CENTRIFUGAL BIO-CONTACTOR APPARATUS

[76] Inventor: Sung Hui Choi, 615-20, Banghak-2-Dong, Dobong-ku, Seoul 132-022, Rep. of Korea

[21] Appl. No.: 249,925

[22] PCT Filed: Jan. 30, 1988

[86] PCT No.: PCT/KR88/00002

§ 371 Date: Sep. 16, 1988

§ 102(e) Date: Sep. 16, 1988

[87] PCT Pub. No.: WO88/05764

PCT Pub. Date: Aug. 11, 1988

[51] Int. Cl.[5] ............................................. C02F 3/08
[52] U.S. Cl. .................................. 210/150; 210/151; 210/619
[58] Field of Search .................... 210/150, 151, 619

[56] References Cited

U.S. PATENT DOCUMENTS

| | | | |
|---|---|---|---|
| 2,798,042 | 7/1957 | Cox | 210/619 |
| 3,109,875 | 11/1963 | Schramm et al. | 210/150 |
| 3,389,798 | 6/1968 | Hartmann et al. | 210/619 |
| 3,540,589 | 11/1970 | Boris | 210/150 |
| 3,839,198 | 10/1974 | Shelef | 210/150 |
| 3,962,087 | 6/1976 | Hartmann | 210/150 |
| 4,149,972 | 4/1979 | Iwai et al. | 210/150 |
| 4,157,303 | 6/1979 | Yoshikawa et al. | 210/150 |
| 4,160,736 | 7/1979 | Prosser | 210/619 |
| 4,268,385 | 5/1981 | Yoshikawa | 210/150 |
| 4,284,503 | 8/1981 | Stahler | 210/150 |
| 4,318,810 | 3/1982 | Stahler | 210/150 |
| 4,431,537 | 2/1984 | Hirota | 210/150 |
| 4,444,658 | 4/1984 | Hankes et al. | 210/150 |
| 4,537,678 | 8/1985 | Thissen | 210/150 |
| 4,540,491 | 9/1985 | Zimmer | 210/150 |
| 4,549,962 | 10/1985 | Koelsch | 210/150 |
| 4,563,282 | 1/1986 | Wittmann et al. | 210/151 |
| 4,608,162 | 8/1986 | Hankes et al. | 210/150 |
| 4,668,387 | 5/1987 | Davie et al. | 210/150 |
| 4,692,241 | 9/1987 | Nicholson | 210/150 |
| 4,769,138 | 9/1988 | Frandsen | 210/619 |
| 4,836,918 | 6/1989 | Szikriszt | 210/151 |

Primary Examiner—Richard V. Fisher
Assistant Examiner—Cynthia L. Nessler
Attorney, Agent, or Firm—Jordan and Hamburg

[57] ABSTRACT

The apparatus comprises a rotor, plurality of spaced transverse ribs disposed along the axis of the rotor and a plurality of longitudinal ribs having the shape of an impeller of a pump, the plurality of longitudinal ribs being mounted on each of said transverse ribs. The plurality of longitudinal ribs and transverse ribs constitute a biological contactor, thereby causing wastewater to be treated by passing through the biological contactor. The longitudinal ribs are obliquely installed in an appropriate angle with the perpendiculars of the exterior tangent arc of the contactor like the impeller of a pump, thereby making wastewater pass efficiently through the space between the ribs with centrifugality by rotation of the rotor.

22 Claims, 10 Drawing Sheets

CENTRIFUGAL BIO-CONTACTOR APPARATUS

DESCRIPTION

1. Technical Field

This invention relates to an apparatus for biological purification of wastewater, and more particularly to a centrifugal bio-contactor.

2. Background of Invention

Contaminants and microorganisms usually coexist in wastewater, and contaminants, in this case, become the nutrient of the microorganisms and if there is any solid surface in the wastewater, the contaminants get attached to the surface thereof. Biological slimes are formed, as a result of growth and proliferation of microorganisms on the solid surface. The microorganisms within the biological slimes use contaminant for their growth and proliferate, thereby reducing the contaminants in wastewater. In this case, the wider the contacting area, the more the attached microorganisms. In the processes using attached microorganism for the treatment of wastewater, the rotating biological contactor method and fixed bed method have been typically developed in the art. Especially, the method using a rotating biological contactor for the biological treatment of wastewater involves the use of partially submerged bodies forcibly rotated to exposed the organisms on the contact surfaces to the atmosphere for the absorption of oxygen. Such rotating biological contactor have been known in several forms in the past as illustrated in U.S. Pat. Nos. 3,777,891, 3,827,559, 3,847,811, 3,904,525, 3,997,443, 4,122,011, 4,115,268, 4,444,658, etc. However, in the system of such a rotating biological contactor, because more than a half of the horizontal rotor is exposed to the atmosphere or air, once the biological slimes get thick, the increased weight causes the horizontal axis to be bent or to be broken in many cases and the organisms exposed to atmosphere are very sensitive to cold water. Therefore, operating such rotating biological contactor in low-temperature climates requires a housing to limit wastewater temperature reduction or heat loss.

The inventor engaged in research in order to solve the above problems/disadvantages and concluded that a contactor having a plurality of transverse ribs disposed along the axis with a proper spacing between each of the transverse ribs and a plurality of longitudinal ribs having the shape of an impeller of a pump has the advantage of removing the contaminants of wastewater effectively, because the rotation of the rotor which consists of a shaft and such contactor makes the flow of the wastewater smooth, even if the rotor is submerged entirely in wastewater.

As to the flow of wastewater, Trulear and LaMotta disclose that the removal of the contaminant materials depends on the mass transfer when the water flow is below 0.8 to 0.93 m/sec. (Trulear, M.G. "Dynamics of Biofilm Process", J. WPCF. Vol. 54, pp. 1288-1301, 1983; LaMotta, E. J.," External Mass Transfer in a Biological Film Reactor" Biotechnol. Bioeng., Vol. 18, pp. 1359-1370, 1976) and also Rittman discloses that the faster the speed of the flow of the wastewater, the more the quantity of detached microorganisms (Rittman, B. E., "The Effect of Shear Stress on Biofilm Loss Rate", Biotechnol. Bioeng., Vol. 24, pp. 501-506, 1982). Accordingly, the flow of wastewater which passes over the surface of the biological slimes, has an important role not only in transferring contaminants, but also in controlling the amount of microorganisms. The efficiency of treatment will be increased in accordance with the width of the contacting area and smoothness of wastewater flow. The present invention puts the above theory to practical use.

The purpose of the invention is not only to increase the contacting area and make the flow of wastewater smooth in order to increase the efficiency of the treatment, but also to prevent bending and destruction of the axis due to the adverse effect of cold weather. There are three characteristics in this invention. First, the longitudinal ribs of the contactor are installed like those of the impeller of a pump, in order to make the flow of the wastewater smooth, even if the rotor is submerged entirely in wastewater. Rotating of the rotor makes wastewater pass through the space with centrifugality. Second, fine ribs and contact materials are installed in the space between the ribs to increase the contacting area. Third, the shaft of the rotor is installed vertically or immersed in wastewater to provide buoyancy to prevent the axis from being bent or being broken.

BRIEF DESCRIPTION OF THE DRAWINGS

The invention is hereinafter further described with reference to the accompanying drawings, in which.

DETAILED DESCRIPTION OF THE PREFERRED EMBODIMENTS

Figure 1:
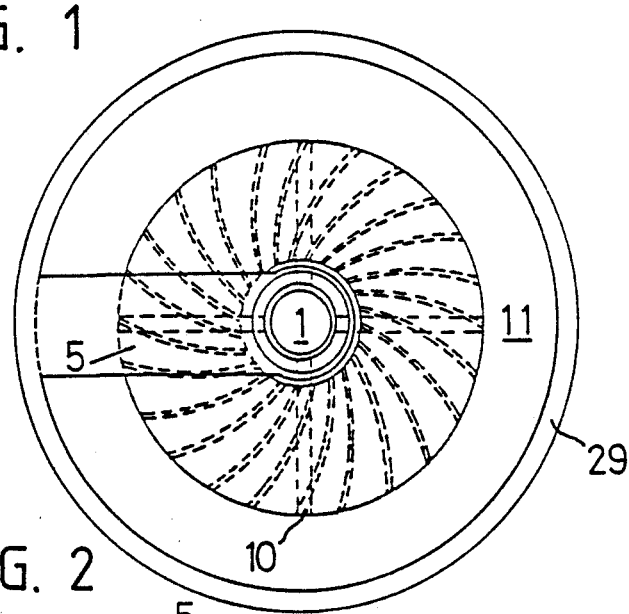
FIG. 1 is the top view of a rotor installed in a vertical reactor.
Figure 2:
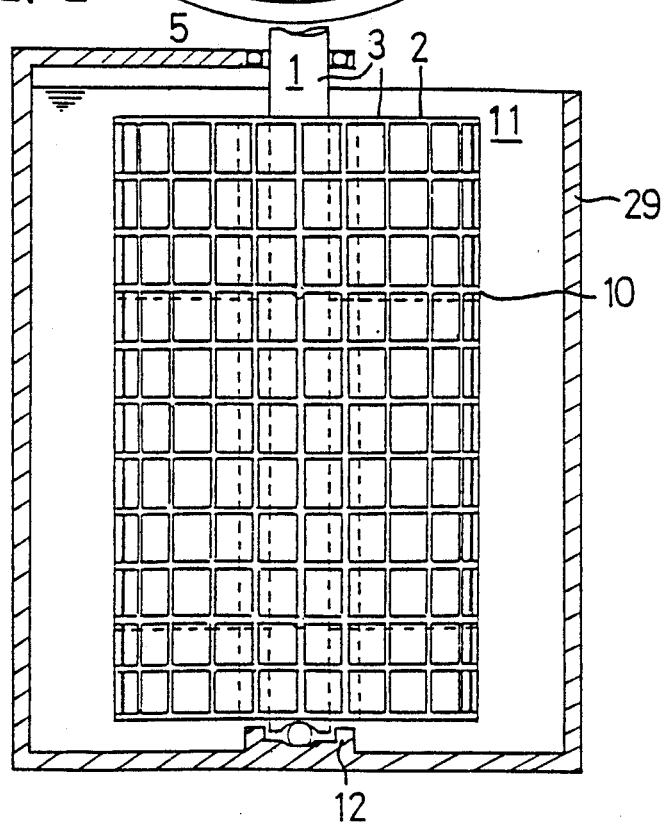
FIG. 2 is the front view of a rotor installed in a vertical reactor.

FIG. 1 and FIG. 2 illustrate a embodiment of an apparatus in which a rotor is installed in a reactor according to the present invention. These figures show the installment of a rotor 3 which is of the proper size for the purpose of treatment process in the reactor 29 containing wastewater 11, and illustrate the wastewater treatment apparatus which purifies the wastewater as a result of the rotation of the rotor 3 on a vertical shaft 1.

The shaft 1 is located at the center with shaft-holder 5 and bearing holder 12, and the contactor 2 is fixed on the shaft 1 with supports 10, the rotor 3 being connected to a motor (not shown) which causes it to rotate.

As shown in FIG. 1, the rotor 3 may be optionally made so that the shaft 1 and the contactor 2 can be separated from each other; or the shaft 1 and the contactor 2 can be arranged as one unit.

Figure 3:
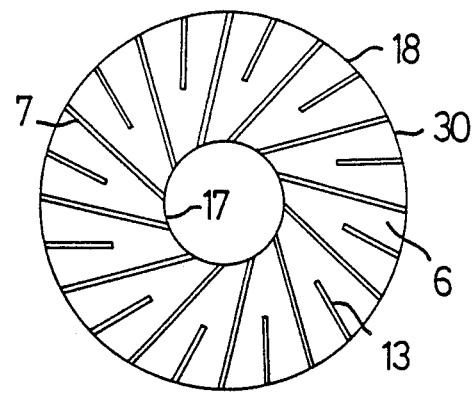
FIG. 3 is a plan view of a contactor whose longitudinal ribs are installed along a straight line.
Figure 4:
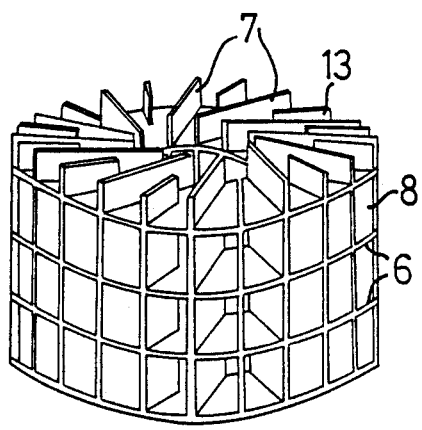
FIG. 4 is a perspective view of a contactor whose longitudinal ribs are installed along a straight line.
Figure 5:
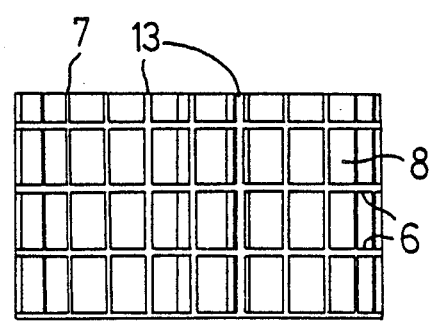
FIG. 5 is a front view of a contactor whose longitudinal ribs are installed along a straight line.
Figure 6:
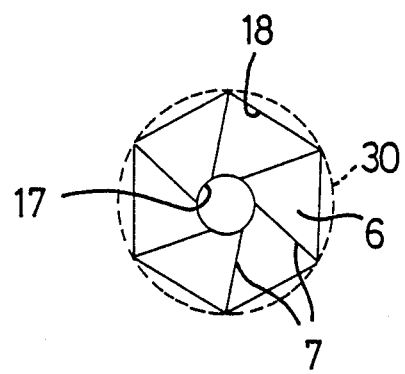
FIG. 6 is a plan view of a contactor whose exterior is a regular hexagon.
Figure 7:
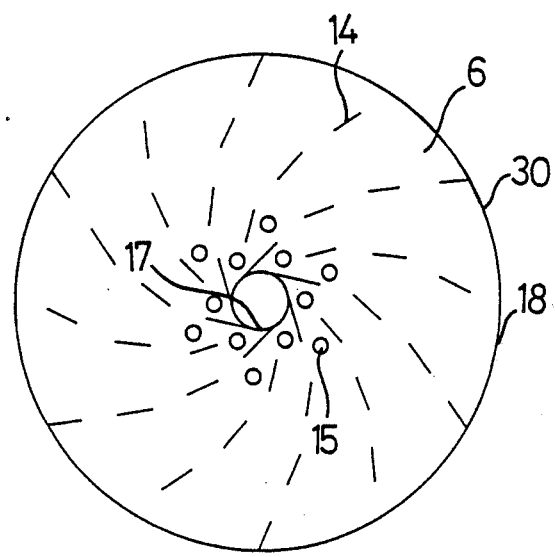
FIG. 7 is the plan view of a contactor whose transverse ribs are perforated.

It is preferable that the exterior 18 of the contactor be either round as illustrated in FIG. 3 and FIG. 7 or an equilateral polygon as shown in FIG. 6. The longitudinal ribs 7 of the contactor are mounted aslant relative to the contactor so that the flow of wastewater can be made smoothly with the ribs serving the role of an impeller, and the rotation of the rotor forces wastewater to flow through the space 8 between the ribs. The longitudinal ribs 7 are mounted along the appropriate curve as in FIG. 1 and FIG. 8 or a straight line, as in FIG. 3, FIG. 6 and FIG. 10.

Figure 8:
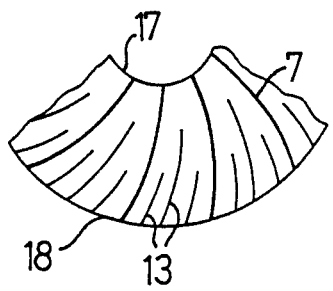
FIG. 8 is a plan view of a significant part of a contactor whose longitudinal ribs are installed along a curve.
Figure 10:
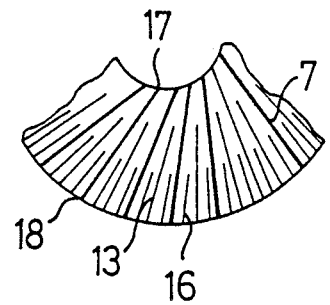
FIG. 10 is a plan view of a significant part of a contactor whose longitudinal ribs and aux-longitudinal ribs and fine ribs are installed along a straight line.
Figure 9:
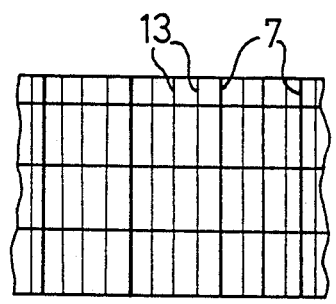
FIG. 9 is a front view of a significant part of a contactor whose longitudinal ribs are installed along a curve.

In order to make the flow of the wastewater smooth, either aux-longitudinal ribs 13 can be mounted, as in FIG. 3, FIG. 8 and FIG. 10, or short longitudinal ribs 14 can be mounted as in FIG. 7.

Figure 11:
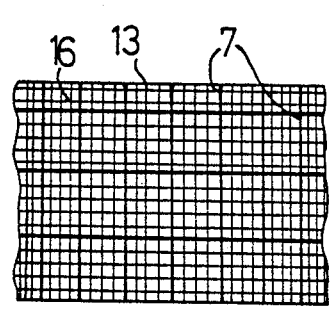
FIG. 11 is a plan view of a significant part of a contactor whose longitudinal ribs and aux-longitudinal ribs and fine ribs are installed along a straight line.
Figure 12:
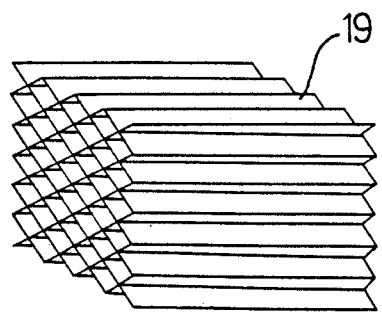
FIG. 12 is a perspective view of a contact material.
Figure 13:
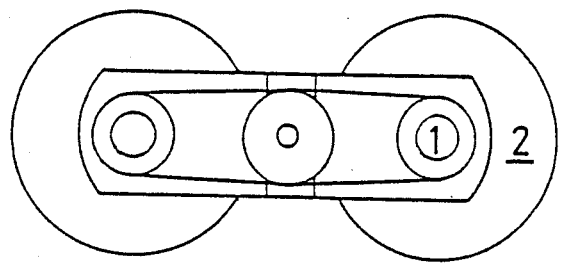
FIG. 13 is a plan view of two rotor installed in a vertical reactor.
Figure 14:
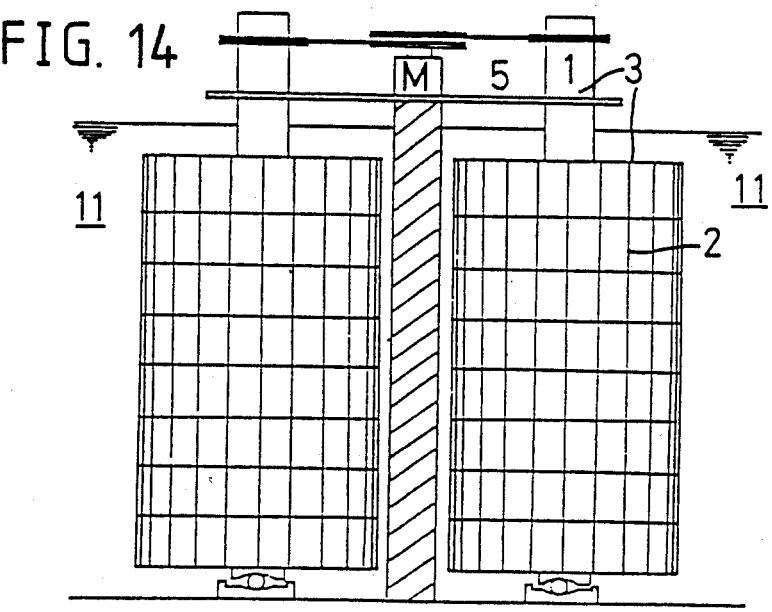
FIG. 14 is a front view of two rotor installed in a vertical reactor.

Further to expand the area to be contacted with wastewater, fine ribs 16 can be mounted densely as in FIG. 10 and FIG. 11. Alternatively, after a closed net (not shown) is installed at the exterior of the contactor, contact material 19, which is available in the market, can be used to fill in the space 8 between the ribs. FIG. 12 is an illustration of a known contact material. FIG. 13 and FIG. 14 illustrate two rotors 3 installed in a reactor. Thus a plurality of rotors 3, if needed, can be installed in a reactor. FIG. 15 through FIG. 19 show the flow of wastewater by the aeration and the rotation of the rotor 3.

Figure 15:
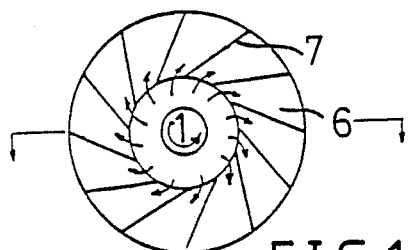
FIG. 15 is a plan view of wastewater flow from interior to exterior.
Figure 17:
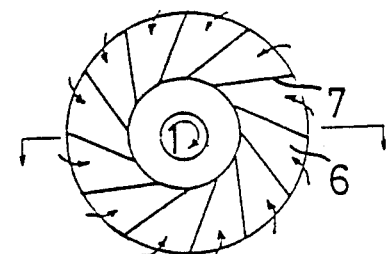
FIG. 17 is a plan view of wastewater flow from exterior to interior.
Figure 16:
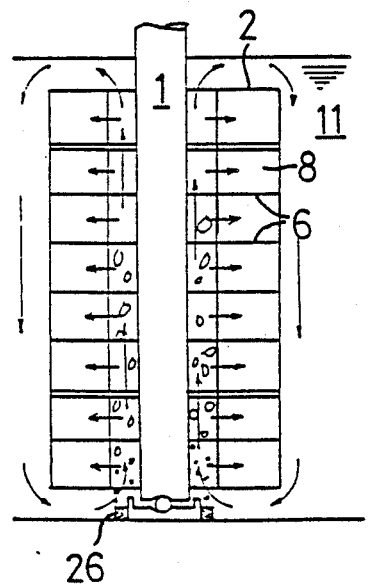
FIG. 16 is a longitudinal sectional view of wastewater flow from interior to exterior.
Figure 18:
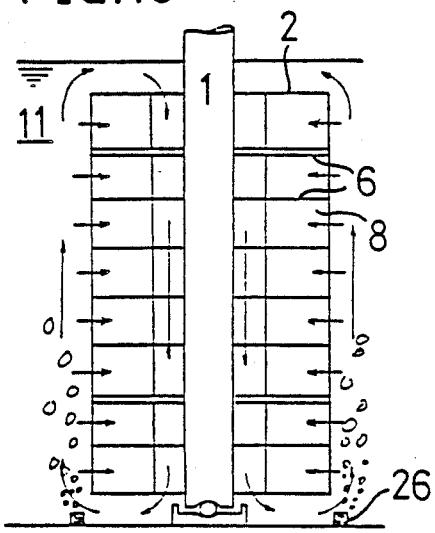
FIG. 18 is a longitudinal sectional view of wastewater flow from exterior to interior.
Figure 19:
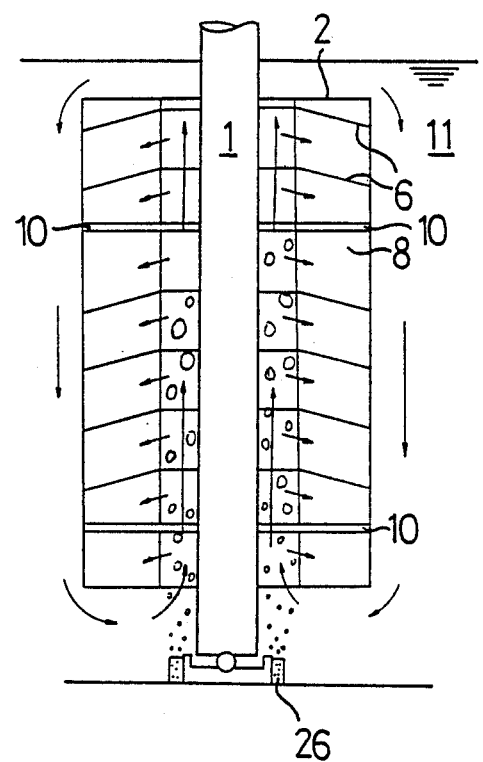
FIG. 19 is a longitudinal sectional view of wastewater flow from interior to exterior using a rotor whose transverse ribs are conical.

The mixing intensity and the volumetric oxygen transfer rate can be increased in one of the following ways;

(1) With the interior 17 of the contactor spaced some distance from the shaft 1 or with the transverse ribs 6 of the contactor perforated appropriately as in FIG. 7, aeration equipment can be installed as close as possible to the interior 17 of the contactor as in FIG. 16 and FIG. 19, and the rotor can be rotated as in FIG. 15 so as to make the wastewater flow in the direction toward the exterior 18 of the contactor from the interior 17 of the contactor, (2) Aeration equipment can be installed as close as possible to the exterior 18 of the contactor as in FIG. 18, and thus makes the wastewater flow in the direction toward the interior 17 of the contactor from the exterior as in FIG. 17 by rotation of the rotor.

Figure 20:
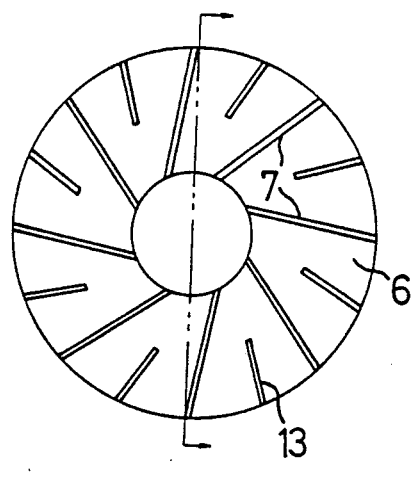
FIG. 20 is a plan view of a contactor whose transverse ribs are conical.
Figure 21:
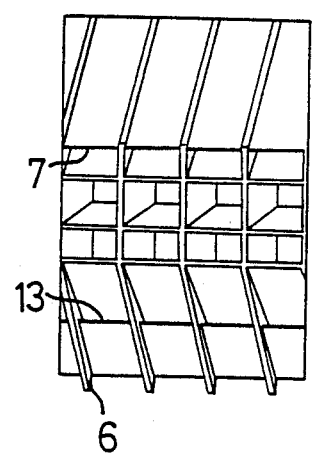
FIG. 21 is a longitudinal view of a contactor whose transverse ribs are conical.
Figure 22:
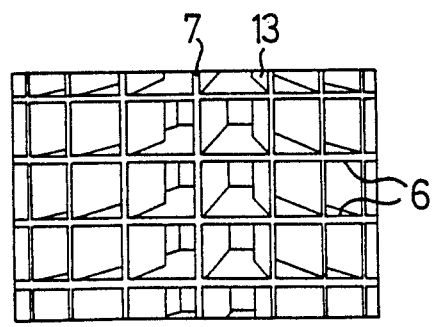
FIG. 22 is a front view of a contactor whose transverse ribs are conical.
Figure 23:
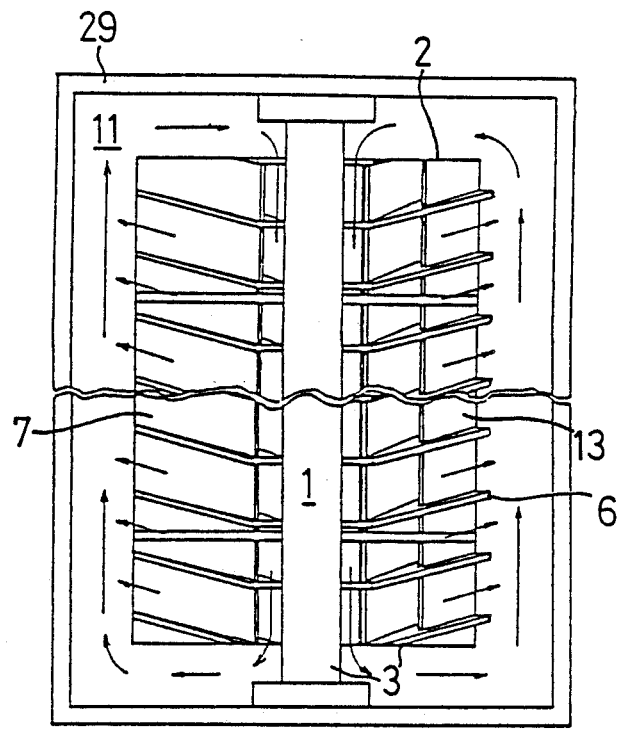
FIG. 23 is a transverse section view of a rotor installed horizontally.
Figure 24:
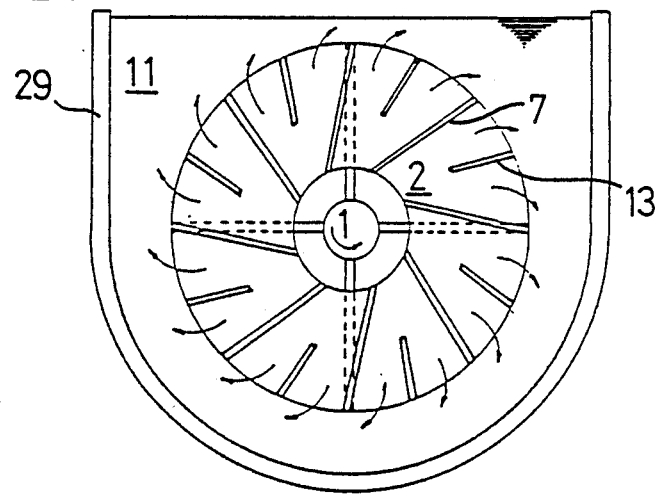
FIG. 24 is a longitudinal section view of a rotor installed horizontally.

Furthermore, the flow of wastewater can be controlled by rotating the rotor 3 where the transverse ribs 6 are in a conical form as in FIG. 20 and FIG. 21. FIG. 22 shows the rotor 3 with conical transverse ribs 6 installed horizontally such as to be immersed entirely in wastewater and the flow of the wastewater is effected according to the rotation.

For a processing of wastewater treatment in which the contacted area serves a more important role than the wastewater mixture does in the reactor, the interior 17 of the contactor and shaft 1 can be installed touching each other.

Either the transverse ribs 6 or the longitudinal ribs 7 of the contactor, as needed, can be perforated or the short transverse ribs 14 can be mounted in the space between the exterior 18 of the contactor 15 and the interior 17 of the contactor as in FIG. 7.

Figure 25:
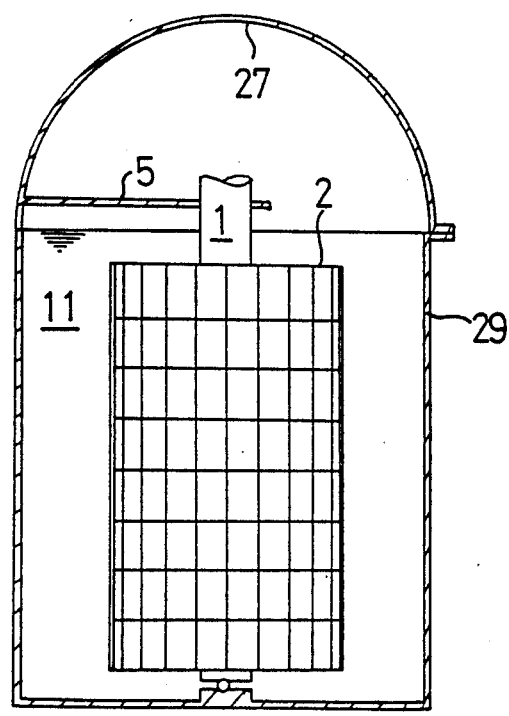
FIG. 25 is a front view of a rotor installed in an anaerobic reactor.
Figure 26:
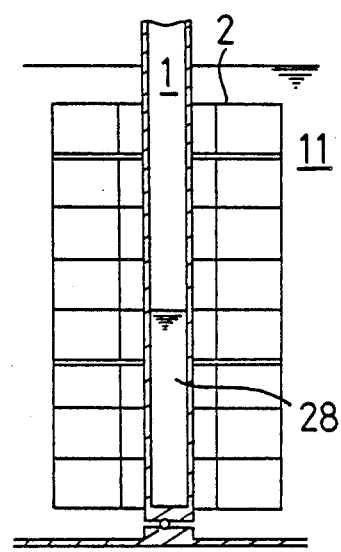
FIG. 26 is a longitudinal section view of a rotor whose shaft is hollow.

Especially, for the anaerobic process, a lid 27 can be installed as in FIG. 25. If necessary, the axis can be made hollow and filled with a proper filler which has some weight, thus further controlling the weight of the rotor 3.

In summary, the rotation of the rotor 3, of which the longitudinal ribs 7 and the aux-longitudinal ribs 13 of the contactor are mounted obliquely to perpendiculars of interior tangent arcs 30 makes a smooth flow of the wastewater in the spaces 8 between the ribs. The installation of the fine ribs 16 and/or the ribs filled up with contact material 19 in the spaces 8 between the ribs expands the area to be contacted, thereby increasing the efficiency of the wastewater treatment.

Either installing the shaft vertically or immersing the rotor 3 entirely in wastewater results in preventing shaft 1 from being bent or from being broken which has previously happened because of the weight of the rotor 3.

APPLICATION OF THE INVENTION

The invention can be operated either in a batch mode or a continuous flow mode. Major wastewater treatment processes using the invention are the aerobic process, anoxic process, anaerobic process, and a combination of aerobic/anoxic or anaerobic process.

The principal application of the processes of the invention are for (1) the removal of carbonaceous organic matter in secondary wastewater treatment, (2) nitrification and denitrification in advanced wastewater treatment and (3) stabilization in sludge treatment.

I claim:

1. Apparatus for treating waste water comprising a reactor vessel containing said waste water, and a means for biologically contacting said waste water, said biological contacting means comprising a rotor means on which microorganisms are attached, said rotor means being disposed in said reactor vessel and fully submerged in said waste water in said reactor vessel, a rotor shaft rotatably supporting said rotor means for rotation in said reactor vessel about a rotor axis, said rotor means having an outer peripheral boundary and an inner peripheral boundary, said outer peripheral boundary being spaced radially outwardly of said inner peripheral boundary, said rotor means having an internal space between said outer and inner peripheral boundaries, a plurality of spaced longitudinal ribs extending from said outer peripheral boundary into said space between said outer and inner peripheral boundaries, said longitudinal ribs being offset from and disposed at acute angles relative to radial lines which extend radially from said rotor axis, and a plurality of spaced transverse ribs disposed generally perpendicular to said longitudinal ribs, said transverse ribs being joined to two of said longitudinal ribs which are successively spaced such as to form waste water passages between successive spaced transverse ribs and successive spaced longitudinal ribs, said longitudinal ribs being operable to impart a centrifugal force to the waste water in said waste water passages as said submerged rotor means rotates in said reactor vessel.

2. Apparatus accrding to claim 1, wherein said rotor means has opposite spaced longitudinal ends, said longitudinal ribs extending continuously longitudinally of said rotor means from one of said longitudinal ends to the other of said longitudinal ends.

3. Apparatus according to claim 1, wherein said outer peripheral boundary of said rotor means has a cylindrical configuration, said longitudinal ribs each intersecting said cylindrically configured outer peripheral boundary at a point of intersection, each of said longitudinal ribs extending from its respective point of intersection at an acute angle relative to a tangent line which is tangential to said cylindrically configured outer peripheral boundary at said point of intersection.

4. Apparatus according to claim 1, wherein said longitudinal ribs are constructed as impeller blades to effect a pumping action on said waste water in said reactor vessel as said rotor means rotates in said reactor vessel.

5. Apparatus according to claim 1, wherein said longitudinal ribs are generally planar ribs each disposed in a single plane.

6. Apparatus according to claim 1, wherein said longitudinal ribs are curvilinear.

7. Apparatus according to claim 1, wherein said longitudinal ribs extend from said outer peripheral boundary of said rotor means to said inner peripheral boundary of said rotor means.

8. Apparatus according to claim 1, wherein said transverse ribs are disposed perpendicular to said rotor axis.

9. Apparatus according to claim 1, further comprising perforations in said longitudinal ribs.

10. Apparatus according to claim 1, further comprising biological contact material means disposed in said waste water passages.

11. Apparatus according to claim 1, wherein said rotor axis is vertically disposed.

12. Apparatus according to claim 1, wherein said rotor axis is horizontally disposed.

13. Apparatus according to claim 1, wherein said transverse ribs have a generally frustoconical configuration, with each frustoconically configured rib having a cone axis which is coincident with said rotor axis.

14. Apparatus according to claim 13, wherein said frustoconically configured ribs extend radially outwardly and longitudinally of said rotor axis.

15. Apparatus according to claim 1, wherein said inner peripheral boundary of said rotor means is in the form of a cylinder, said rotor shaft being coaxially disposed in said cylinder, said cylinder being spaced radially outwardly of said rotor shaft to thereby form an annular space between said rotor shaft and said cylindrical inner peripheral boundary of said rotor means.

16. Apparatus according to claim 15, wherein said rotor axis is vertically disposed, said reactor vessel having a bottom, and aeration means located at said bottom of said reactor vessel and underlying said annular space such that discharge of air from said aeration means rises generally vertically in said annular space.

17. Apparatus according to claim 16, wherein said bottom of said reactor vessel has an inner surface, said rotor shaft having a lower terminating end, and a bearing means on said inner surface of said bottom of said reactor vessel for rotatably supporting said lower terminating end of said rotor shaft on said inner surface.

18. Apparatus according to claim 1, wherein said longitudinal ribs comprise first and second rib parts, said first rib parts extending from said outer peripheral boundary of said rotor means to said inner peripheral boundary of said rotor means, said second rib parts extending from said outer peripheral boundary and terminating a short of said inner peripheral boundary.

19. Apparatus according to claim 18, wherein said first rib parts are spaced from one another and said second rib parts are disposed in the spaces between said first rib parts.

20. Apparatus according to claim 19, wherein a plurality of said second rib parts are provided in said spaces between said first rib parts.

21. Apparatus according to claim 20, wherein said plurality of second rib parts are provided in said spaces between said first rib parts have variable lengths as measured from their outermost radial end to their innermost radial end.

22. Apparatus for treating waste water comprising a reactor vessel containing said waste water, and a means for biologically contacting said waste water, said biological contacting means comprising a rotor means on which microorganisms are attached, said rotor means being disposed in said reactor vessel and fully submerged in said waste water in said reactor vessel, said rotor means having opposite spaced longitudinal ends, a rotor shaft rotatably supporting said rotor means for rotation in said reactor vessel about a rotor axis, said rotor means having an outer cylindrical boundary and an inner cylindrical boundary, said outer cylindrical boundary being spaced radially outwardly of said inner cylindrical boundary, said rotor means having an internal space between said outer and inner cylindrical boundaries, a plurality of spaced longitudinal ribs extending from said outer cylindrical boundary into said space between said outer and inner cylindrical boundaries, said longitudinal ribs extending longitudinally of said rotor means from one of said longitudinal ends to the other of said longitudinal ends, said longitudinal ribs each intersecting said outer cylindrical boundary at a point of intersection, each of said longitudinal ribs extending from its respective point of intersection at an acute angle relative to a tangent line which is tangential to said outer cylindrical boundary at said point of intersection, and a plurality of spaced transverse ribs disposed generally perpendicular to said longitudinal ribs and joined to two of said longitudinal ribs which are successively spaced such as to form waste water passages between successive spaced transverse ribs and successive spaced longitudinal ribs, said longitudinal ribs being operable to impart a centrifugal force to the waste water in said waste water passages as said submerged rotor means rotates in said reactor vessel.

* * * * *